United States Patent
Buarzaiga et al.

(10) Patent No.: US 7,318,914 B2
(45) Date of Patent: Jan. 15, 2008

(54) CHROMIUM REMOVAL FROM LEACH LIQUORS PRODUCED DURING HIGH PRESSURE ACID LEACHING OF LATERITIC ORES

(75) Inventors: Mohamed Buarzaiga, Sudbury (CA); Debbie Marshall, Kingston (CA); Marc Boissoneault, Hanmer (CA); Maxine Hoffman, Garson (CA); Carlton A. Potter, Garson (CA)

(73) Assignee: Falconbridge Limited, Toronto, Ontario (CA)

( * ) Notice: Subject to any disclaimer, the term of this patent is extended or adjusted under 35 U.S.C. 154(b) by 292 days.

(21) Appl. No.: 10/498,837

(22) PCT Filed: Dec. 16, 2002

(86) PCT No.: PCT/CA02/01930

§ 371 (c)(1),
(2), (4) Date: Jun. 14, 2004

(87) PCT Pub. No.: WO03/056045

PCT Pub. Date: Jul. 10, 2003

(65) Prior Publication Data

US 2005/0118082 A1    Jun. 2, 2005

(30) Foreign Application Priority Data

Dec. 21, 2001 (CA) .................................. 2366095

(51) Int. Cl.
    *C01G 37/00* (2006.01)
(52) U.S. Cl. ....................................................... 423/55
(58) Field of Classification Search .................. 423/53, 423/55; 210/913
    See application file for complete search history.

(56) References Cited

U.S. PATENT DOCUMENTS 3,761,566 A    9/1973  Michal 4,044,096 A    8/1977  Queneau et al.
6,139,602 A *  10/2000 Sharp et al. ................... 75/711
2002/0006370 A1*  1/2002 Arroyo et al. ............. 423/150.1

FOREIGN PATENT DOCUMENTS

GB          798478 A         7/1958
JP          61006216 A    *  1/1986
WO       WO 0162989 A1      8/2001

OTHER PUBLICATIONS

Han et al., Jan. 2000, Water Environmental Research, vol. 72, pp. 29-39, "Removal of Hexavalent Chromium from Groundwater by Granular Activated Carbon".*
Carlson, E. T. et al., "Pressure Leaching of Nickeliferous Laterites with Sulfuric Acid", Extractive Metallurgy of Copper, Nickel, and Cobalt, 1960, pp. 363-397, Interscience Publishers, New York.
Duyvesteyn, W. P. C. et al., "An Omnivorous Process for Laterite Deposits", International Laterite Symposium, pp. 553-570, AMAX Extractive Research & Development, Inc., Golden.
Georgiou, D. et al., "Sulphuric acid pressure leaching of a limonitic laterite: chemistry and kinetics", Hydrometallurgy, 1998, pp. 23-46, vol. 49, Elsevier Science B.V.
Carlson, E. T. et al., "Pressure Leaching of Nickeliferous Laterites with Sulfuric Acid", Extractive Metallurgy of Copper, Nickel, and Cobalt, 1960, pp. 363-397, Interscience Publishers, New York.
Duyvesteyn, W. P. C. et al., "An Omnivorous Process for Laterite Deposits", International Laterite Symposium, pp. 553-570, AMAX Extractive Research & Development, Inc., Golden, no date.
Georgiou, D. et al., "Sulphuric acid pressure leaching of a limonitic laterite: chemistry and kinetics", Hydrometallurgy, 1998, pp. 23-46, vol. 49, Elsevier Science B.V.

* cited by examiner

*Primary Examiner*—Wayne A. Langel
*Assistant Examiner*—James Fiorito
(74) *Attorney, Agent, or Firm*—Holland & Bonzagni, P.C.; Mary R. Bonzagni, Esq.

(57) ABSTRACT

A method is provided for the removal of chromium from leach liquors produced during high pressure leaching of laterite ores in an autoclave, by addition to the autoclave of carbon in a quantity of about 0.5%-1% by weight with reference to the total dry feed.

9 Claims, 2 Drawing Sheets

CHROMIUM REMOVAL FROM LEACH LIQUORS PRODUCED DURING HIGH PRESSURE ACID LEACHING OF LATERITIC ORES

FIELD OF THE INVENTION

This invention relates to a method of removing chromium from leach liquors which are produced during high pressure leaching of lateritic ores. More particularly, it relates to the removal of chromium in the autoclave during the hydrometallurgical process used for treating laterite ores, such as limonitic ore deposits, to extract Ni and Co values therefrom.

BACKGROUND OF THE INVENTION

Lateritic ore deposits contain most of the Ni and Co resources in the earth's crust. The known reserve of Ni in laterite ores is about three times that of the sulfide ores. However, until recently the majority of Ni and Co productions came from sulfide ore deposits, which are expensive to mine, but can be readily concentrated. Ni and Co can be extracted from lateritic ores using a pyrometallurgical process involving drying, calcining, and smelting; however, this technology is best suited to the serpentinic fraction of the ore. It is unsuitable for high-iron laterite ores called limonitic ores, because of low-grade ferronickel product and high production cost.

Recent improvements in the technology of pressure acid leaching make the hydrometallurgical process an attractive route for processing limonitic ore deposits. Such process is disclosed, for example, by D. Georgiou and V. G. Papangelakis in an article entitled "Sulphuric acid pressure leaching of a limonitic laterite: chemistry and kinetics" Hydrometallurgy 49 (1998) 23-46. Also, E. T. Carlson and C. S. Simons provide a good description of such process in "Pressure Leaching of Nickeliferous Laterites with Sulfuric Acid" published in Extractive Metallurgy of Copper, Nickel and Cobalt, edited by P. Queneau, Interscience Publishers, New York, N.Y. (1961) pp. 363-397. Another description of such process is provided by W. P. C. Duyvesteyn, G. R. Wicker and R. E. Doane in an article entitled "An Omnivorous Process for Laterite Deposits" given at International Laterite Symposium, New Orleans, La. (1979).

The feed to such hydrometallurgical process is a lateritic ore slurry with a pulp density of 25 to 50% solids. The slurry is heated in an autoclave to a temperature in the range 240 to 270° C., which corresponds to a pressure range of 500-800 psi, then contacted with sulfuric acid. The acid is added in sufficient amounts to give a residual free acid concentration of 30 to 50 g/L at room temperature before flashing. The retention time ranges from 25 to 105 minutes. Under these conditions most of the contained Ni and Co enter the solution; the extraction levels are typically 95% and 91% for Ni and Co, respectively.

During such high pressure acid leaching, impurity elements also enter the solution and can be detrimental to downstream processes. Al and Fe hydrolyze and precipitate leaving only small amounts thereof in the leach liquor. The residual Al and Fe concentrations are subsequently precipitated in a partial neutralization step. Cr is another important impurity in the leach liquor. About 4-25% of the Cr in the feed is leached, and under the oxidizing conditions of the autoclave, the dissolved Cr is in the hexavalent state, $Cr_2O_7^{-2}$. The concentration of Cr(VI) in the liquor depends on the feed composition. A typical Cr(VI) concentration ranges from 300 to 1500 ppm. Hexavalent chromium is an environmental hazard and impacts downstream processes. For example, Cr poisons the organics in solvent extraction and makes solvent extraction an expensive option. Also, Cr(VI) is not readily precipitated and must be converted to the trivalent state for subsequent easier removal downstream. A method for the rejection of Cr is therefore highly desirable.

OBJECTS AND SUMMARY OF THE INVENTION

It is an object of the present invention to provide a process for the removal of chromium from leach liquors produced during high pressure leaching of lateritic ores, and particularly limonitic ores.

Another object is to achieve such removal by a simple operation of adding carbon to the leach liquor inside the autoclave.

Other objects and advantages of the invention will be apparent from the following description thereof.

In accordance with the present invention, it has been surprisingly found that the dissolved Cr is rejected from the leach liquor inside the autoclave by the addition of carbon. This addition can be done at the start of the process with other feed materials that are fed into the autoclave, or it can be done at a later stage of the pressure leach operation. Any amount of carbon will produce rejection of Cr in the leach liquor, however, about 0.5% to 1% by weight of carbon with reference to the total dry feed has been found to be the optimum, and amounts exceeding this concentration do not produce further benefits, although they can be used if desired. Moreover, carbon can be in any desired form, such as carbon-black, coke, graphite, activated carbon or a combination thereof.

Carbon addition reduces the redox potential by about 100 to 300 mV from values of about 800 to 1000 mV which prevail in the absence of carbon. The redox potential is measured against standard hydrogen electrode (SHE). This has no detrimental effect on materials of construction and has a slight positive effect on the dissolution kinetics. The feed slurry is completely leached within about 25 to 105 minutes. The addition of carbon produces a minor increase in the concentration of Fe in the liquid phase or a slight decrease in the selectivity with respect to Fe. This, however, is not detrimental.

BRIEF DESCRIPTION OF THE DRAWINGS

The invention will now further be described with reference to the appended drawings in which.

DETAILED DESCRIPTION OF THE INVENTION

A preferred embodiment of the invention will now be described with reference to the appended drawings.

Figure 1:
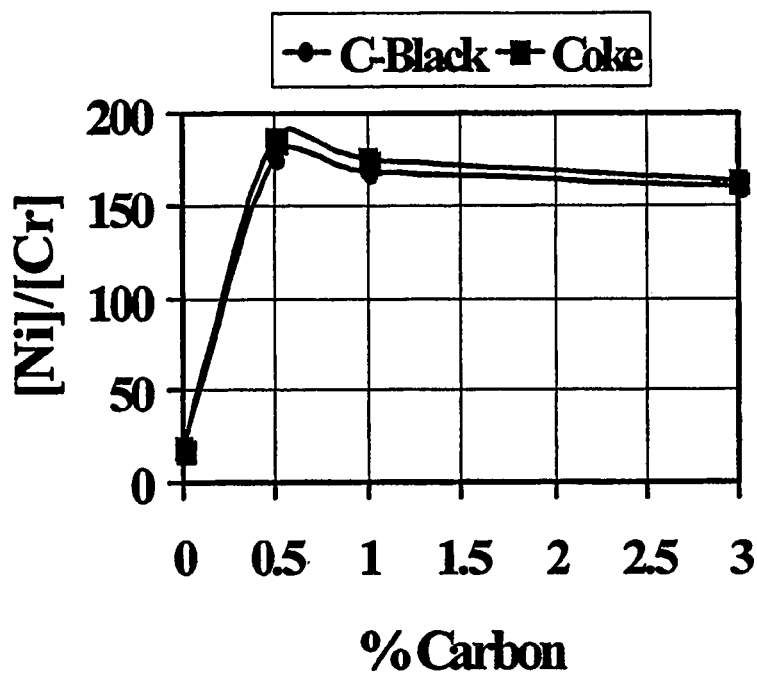
FIG. 1 is a graph showing the effect of C addition on selectivity to Cr using various concentrations of two types of carbon.

FIG. 1 shows two curves representing the effect of addition of various concentration of carbon black and metallurgical coke respectively on the selectivity with respect to Cr in the leach liquor. This graph shows that a 0.5% C addition increases the [Ni]/[Cr] ratio (selectivity), namely the concentration of Ni in the liquid phase with reference to the concentration of Cr, by a factor of about 10. Greater concentrations of C, for example 1%, do not produce better results, although they are also acceptable. The test conditions for this graph were as follows: acid/ore ratio=0.32; solids=30%; temperature to which the slurry in the autoclave is heated=260° C.

Figure 2:
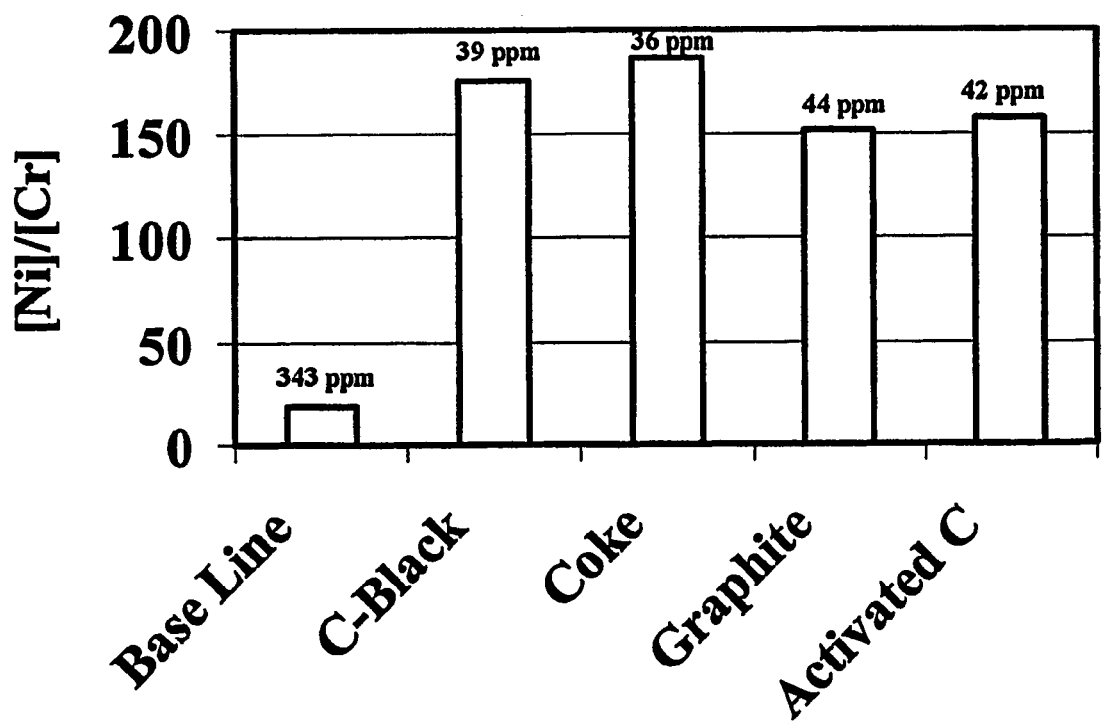
FIG. 2 is a graph showing the levels of Cr reduction achieved using various types of carbon.

FIG. 2 illustrates the addition of 1% by weight of various types of carbon with reference to the solids feed in a leaching process under conditions mentioned above in relation to FIG. 1. In this FIG. 2 the addition of 1% of various types of carbon is compared to a base line where no carbon addition is made as to the amount of Cr in the leach liquor. Thus, the base line leaching without any carbon addition resulted in having 343 ppm of Cr at the end of the leaching operation. The addition of 1% carbon in various forms resulted in the reduction of the Cr concentration to between 36 ppm and 44 ppm.

Figure 3:
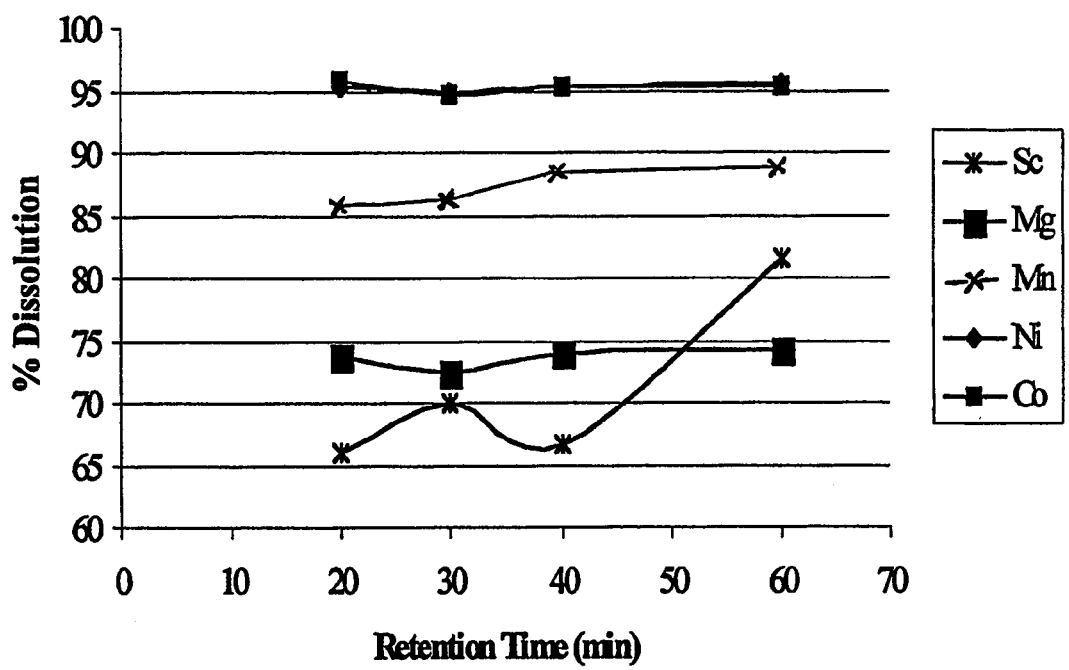
FIG. 3 is a graph showing extraction curves for elements with a high degree of dissolution for a limonite/saprolite ore leached in the presence of 1% metallurgical coke.

FIG. 3 shows the extraction curves for the elements with a high degree of dissolution in a limonite/saprolite ore blend leached in the presence of 1% metallurgical coke under conditions already described above with reference to FIG. 1 and FIG. 2. The feed to the autoclave contained 1.48% Ni, 0.166% Co; 3.62% Mg; 2.29% Al; 1.71% Cr; 37.4% Fe and 6.94% Si; all percentages being by weight.

In this graph, the dissolution curves for Ni and Co essentially coincide with each other and remain essentially stable after 20 minutes of retention time. The same is true for the Mg and Mn dissolutions. Only scandium dissolution rises considerably after 40 minutes of retention time.

Figure 4:
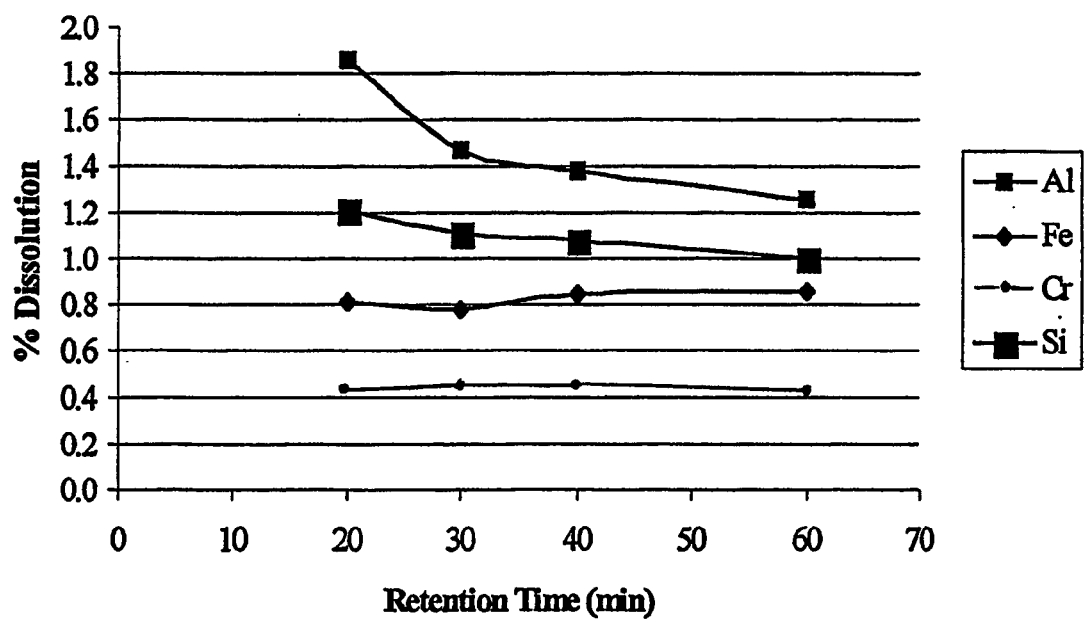
FIG. 4 is a graph showing extraction curves for elements with a low degree of dissolution for the same ore as in FIG. 3 leached under the same conditions.

FIG. 4 shows the extraction curves for the elements of low degree of dissolution for the ore described above with reference to FIG. 3. As shown in this FIG. 4, Cr remains at around 0.4% for the retention time between 20 and 60 minutes. Fe is also fairly constant, while Al and Si are fairly constant after 30 minutes of leaching. Thus, a retention time between 30 and 40 minutes is most appropriate, although it can extend to longer times.

The invention is not limited to the specific embodiments described and illustrated above and includes various modifications obvious to those skilled in the art, without departing from the scope of the following claims.

The invention claimed is:

1. In a method for producing leach liquors by high pressure acid leaching of laterite ores with acid in an autoclave, the improvement comprising removing chromium from the leach liquors by adding carbon to the autoclave.

2. Method according to claim 1, in which the acid leaching is carried out by processing in the autoclave a slurry of the ore in sulphuric acid to a temperature in the range of 240 to 270° C. with a retention time of 25 to 105 minutes.

3. Method according to claim 2, in which the pulp density of the slurry is 25 to 50% solids.

4. Method according to claim 2, in which the acid is added in sufficient amount to give a residual free acid of 30 to 50 g/L at room temperature before flashing.

5. Method according to claim 1, in which the amount of carbon added is such as to produce a reduction in redox potential of between about 100 and 300 mV (SHE).

6. Method according to claim 1, in which the amount of carbon added is about 0.5%-1% by weight with reference to total solids fed to the autoclave.

7. Method according to claim 1, in which carbon is added in the form of carbon black, metallurgical coke, graphite, activated carbon or a combination thereof.

8. Method according to claim 1, in which the laterite ore is a limonitic ore.

9. Method according to claim 8, in which the limonitic ore is a limonite/saprolite ore blend.

* * * * *

UNITED STATES PATENT AND TRADEMARK OFFICE
CERTIFICATE OF CORRECTION

PATENT NO. : 7,318,914 B2 Page 1 of 1
APPLICATION NO. : 10/498837
DATED : January 15, 2008
INVENTOR(S) : Mohamed Buarzaiga et al.

It is certified that error appears in the above-identified patent and that said Letters Patent is hereby corrected as shown below:

In the Specification, Column 1, lines 65-66 of the Patent, change "$Cr_2O_7^-{}_2$" to --$Cr_2O_7^{-2}$--.

Signed and Sealed this

Seventeenth Day of June, 2008

JON W. DUDAS
*Director of the United States Patent and Trademark Office*